United States Patent [19]

Schlüter

[11] 4,109,131
[45] Aug. 22, 1978

[54] WELDING-, CUTTING-, OR HEATING TORCH

[75] Inventor: Jürgen Schlüter, Laatzen, Fed. Rep. of Germany

[73] Assignee: E. Schlüter Fachhandel für Schweisstechnik, Laatzen

[21] Appl. No.: 792,301

[22] Filed: Apr. 29, 1977

[30] Foreign Application Priority Data

Apr. 30, 1976 [DE] Fed. Rep. of Germany ....... 2619177

[51] Int. Cl.² ............................................. B23K 9/00
[52] U.S. Cl. ................................ 219/137.62; 219/74; 219/75
[58] Field of Search ...................... 219/130, 74, 75, 76; 165/106; 239/132.3

[56] References Cited

U.S. PATENT DOCUMENTS

| | | | |
|---|---|---|---|
| 1,849,814 | 3/1932 | Woodruff | 239/132.3 |
| 2,727,970 | 12/1955 | Turbett | 219/130 |
| 3,369,594 | 2/1968 | Farrell | 165/106 |
| 3,529,126 | 9/1970 | Reeh | 219/130 |
| 3,602,297 | 8/1971 | Kraft | 165/105 |
| 3,943,964 | 3/1976 | Asselman et al. | 165/105 |
| 3,945,353 | 3/1976 | Dreisin | 165/105 |
| 3,958,627 | 5/1976 | Edelstein | 165/105 |

FOREIGN PATENT DOCUMENTS

| | | | |
|---|---|---|---|
| 77,366 | 2/1955 | Netherlands | 239/132.3 |
| 273,211 | 3/1927 | United Kingdom | 239/132.3 |
| 537,045 | 6/1941 | United Kingdom | 239/132.3 |

*Primary Examiner*—J. V. Truhe
*Assistant Examiner*—J. H. Bouchard
*Attorney, Agent, or Firm*—Michael J. Striker

[57] ABSTRACT

A torch for welding, cutting or heating comprises a torch head having at least one outlet nozzle, a torch housing spaced from the torch head, connecting means connecting the torch head with the torch housing and provided with passages therethrough to be flown through by a cooling medium, and elongated hermetically sealed heat-transmitting means extending through the connecting means for automatically transporting heat from a heat receiving zone adjacent the torch head to a heat releasing zone adjacent the torch housing for cooling the torch head, in which the heat releasing zone is cooled by the cooling medium passing through the aforementioned passages.

19 Claims, 6 Drawing Figures

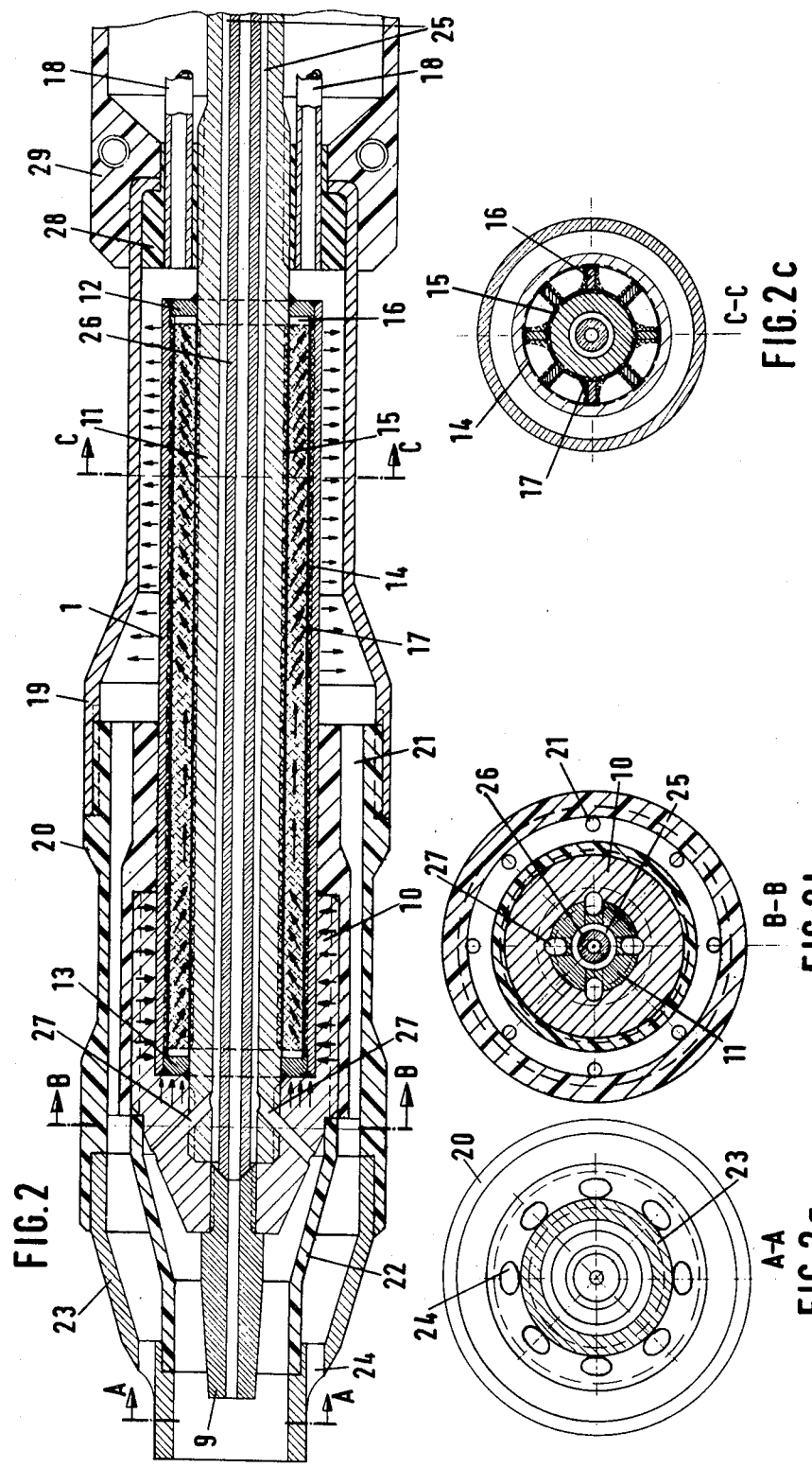

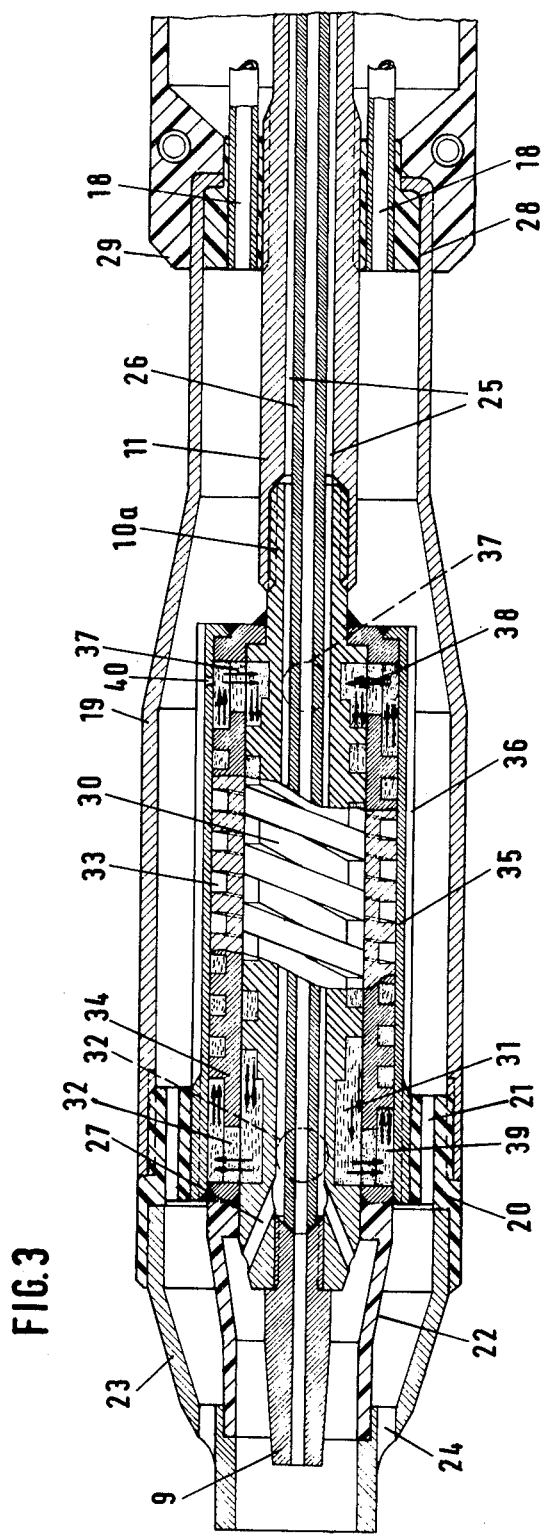

WELDING-, CUTTING-, OR HEATING TORCH

BACKGROUND OF THE INVENTION

The present invention relates to a welding-, cutting-, or heating torch with a torch head provided with an outlet nozzle or outlet nozzles and a torch body connecting the torch head with a torch housing and provided with feed passages therethrough, whereby at least part of the torch body and the torch head is flown through by a cooling medium for convective heat transmission.

The modern use of such torches and especially welding torches for hand or machine operation leads to increased temperatures in the region of the torch head nozzles. This is especially the case during so-called protective gas welding, since the thermal loading of the torch head increases during use of protective gases, especially by use of noble gases, such as argon or helium. Since in the modern welding technique high alloyed steels, as well as light metals are often welded according to the protective gas welding process and especially according to the Sigma, respectively MIG-MAG-process, the use of pure noble gases as protective gas is absolutely necessary, since these noble gases best prevent the influence of the atmosphere onto the welding- and welding-boundary zones of alloyed steels and light metals. However, also at other welding processes, for instance at the WIG welding process, the plasma-welding and cutting process, the beneath-powder-welding-and heating torches which operate with a burner gas-oxygen mixture, the thermal loading of the torch head continuously increases.

In known torches of the above-mentioned kind, it has been tried to cool the torch head, and especially the thermally highly loaded nozzle zone thereof, exclusively by cooling media under use of convective heat transmission. In practice it has however been shown, that such a cooling by means of convective heat transmission is either not sufficient to prevent a thermal overloading of the burner head, or that for such cooling such a technical expenditure is necessary which is unacceptable for a practical operation. All cooling systems operating exclusively with convective heat transmission require a high technical expenditure since circulation pumps for the cooling medium are necessary while the connecting conduits complicate the torch operation and may lead to accidents. The known cooling systems operating strictly with convective heat transmission have the basic disadvantage that only a relatively small temperature drop is possible at a heat transport over longer distances or that considerable large amounts of cooling media with a high flow speed are necessary.

SUMMARY OF THE INVENTION

It is an object of the present invention to use in torches of the above-mentioned kind a new cooling principle, assuring, also at highest thermal loading of the torch head, a sufficient removal of heat and subsequent cooling, whereby this object is to be obtained with a minimum expenditure and preferably without separate cooling media for the convective heat transmission. This object is to be obtained with all welding-, cutting-, or heating torches, especially with Sigma-welding torches, which operate according to the metal-inert-gas (MIG), or metal-active-gas (MAG) method, at WIG-welding torches (operating according to the Tungsten-inert-gas method), at plasma-welding and cutting torches, which use as plasma mixtures of argon-hydrogen and argon-nitrogen, as well as similar plasma mixtures, and with all protective gas welding and cutting torches, which operate with protective gases such as helium, argon, argon-$CO_2$ mixtures and according to the below-powder-welding process.

This object is obtained according to the present invention in that between the thermally highly loaded region of the torch head and a region of the torch body which is circumcirculated and/or flown through by a cooling medium, a hermetically sealed heat transmission system containing a heat transporting medium is arranged, with an automatic heat transport between its heat receiving and its heat releasing zone, and in which at least the heat releasing zone is circumcirculated or flown through by a cooling medium. With such a heat transmitting system it is possible to transmit the heat developed at the torch head over a relatively short transmitting distance and with high speed to the region of the torch which is flown through by the cooling medium, whereafter the thus-transmitted heat is transported away by the cooling medium. The zone of the torch head, which in the mentioned modern welding processes is highly heated, will therefore be thermally relieved, the heat is transported away quickly from the highly loaded zone to be then transported away by the cooling medium. The cooling system of the torch is thus divided in a primary system, consisting of the heat transmitting system according to the present invention, and a secondary system with convective heat removal, whereby in practice an extremely active thermal cooling of the torch head is obtained. The closed heat transmitting system according to the present invention can be mounted directly into the torch, so that in torches operating with protective gas, as well as in all other torches operating with gas, it has been shown that as cooling medium, for the mentioned secondary system with convective heat transmission, the protective gas, respectively the operating gases, may be used for complete cooling, so that the mentioned additional systems for the cooling medium of the convective heat transmission with their mentioned disadvantages may be dispensed with. Thereby a considerable simplification of the torch construction is obtained, in addition to the mentioned efficient cooling of the torch head. To obtain the mentioned action of the heat transmitting system it has been proven especially advantageous, if, according to one form of construction, the closed heat transmitting system according to the present invention contains a liquid heat transport medium which evaporates in the heat receiving zone and condenses in the cooled heat releasing zone, and a capillary structure for transporting the condensed heat transmitting medium from the heat releasing zone back to the evaporating region of the heat receiving zone. Such a heat transmitting system is in principle known as a so-called heat pipe. The action of such a heat pipe is practically completely independent from its position, so that its heat transmitting characteristic is fully available regardless of its mounting in the torch. In the following the principle characteristics of the heat pipe and its basic construction according to the present invention will be discussed.

In a heat pipe a physical principle is used in which circulation of the heat transport medium is obtained independent of gravitational forces, solely by a temperature gradient. This principle is based on the capillary forces, respectively, the surface tension of the used heat transport medium. In principle, the heat pipe is composed of a tube the inner surface thereof is covered by a wig or a system of a capillary structure. The capillary structure consisting of capillary grooves or fine mesh wire nets is saturated with a liquid heat transport medium. One end of heat pipe, i.e. the heat receiving zone thereof, is heated so that the liquid will evaporate from the capillary structure. The vapor will flow in direction of the temperature gradient and condense in the heat releasing zone at the other end of the pipe, whereby the heat of evaporation absorbed in the evaporating zone is again given off in the condensation zone. The condensate is again returned to the evaporation or heat receiving zone through the capillary structure by means of the capillary forces provided thereby.

In contradistinction to the natural circulation in which such circulation is influenced by gravitational forces, it is possible in a heat pipe to adapt the capillary forces to the necessary requirements by suitable choice of geometric parameters of the pipe so that it is also possible to operate against gravitational forces. The heat pipe is a simple constructive element which makes circulation pumps, as well as sealing and lubricating means unnecessary. The heat pipe is also closed and can therefore be considered as heat conductor of high heat conductive capacity. The "apparent heat conductive capacity" of the heat pipe is $10^3$ to $10^4$ times greater than that of a good metallic heat conductor, for instance copper.

The heat transporting characteristics of the heat pipe will depend on the surface tension of the respective heat transporting medium to be used and the evaporating heat thereof. The basic phenomenon, that is the surface tension, depends on the different molecular cohesion forces of two bordering phases. Correspondingly, there prevails in the transition region between the phases a pressure drop, when the border surface is curved. The heat stream in a heat pipe is defined by the product of heat evaporation and the mass stream of the circulating heat transport medium. The temperature at any point of the heat pipe is determined by the vapor pressure prevailing at this point and the border surface curvature, as well as by the pressure in the liquid. Considering the above statements, it will be evident that the heat stream in a heat pipe will depend linearly on the temperature drop, which thus maintains the circulation of the heat medium. At predetermined dimensions of the heat pipe it is possible to choose the geometrical parameters of the capillary structure in an optimal manner.

The selection of the heat transport medium will depend on the operating temperature of the torch, respectively on the maximum temperatures which in a critical region of the torch to be cooled will permanently occur. Likewise important for the selection of the heat transport medium, is its capillary activity, that is, in order that the capillary forces will be obtained in the desired manner, a perfect wetting of the capillary structure by the heat transporting medium is necessary. The transport qualities of the heat transport medium will depend mainly on its material characteristics. Thereby it has to be taken into account that the operating temperature of the heat pipe, respectively of the used torch, is sufficiently below critical points of the material characteristics of the used heat transport medium.

In the selection of the heat transport medium the corrosion resisting quality thereof has also be to considered in correspondence with the material of the capillary structure. The chemical compatibility of the heat transport medium and the material of the capillary structure has to be assured. Of importance is a small solubility of the material of the capillary structure in the heat transporting medium. In order to assure a favorable starting characteristic of the heat pipe according to the present invention, the melting point of the heat transport medium should be as low as possible and the medium should have a small vapor pressure at the melting point.

Since the heat has to be transmitted, respectively carried away, through the wall of the heat pipe, the heat conductive capacity of this wall has to be as large as possible. As already mentioned, the capillary structure according to the present invention may consist of longitudinally extending grooves or screw threads at the inner surface of the tube and/or of a fine mesh wire net placed against the inner tube surface. In each case it is necessary that the surface of the capillary structure will be properly wetted by the heat transport medium, while the capillary structure should not be corroded by the heat transport medium. This requirement may be obtained by a suitable surface cover (a tube formed of tantalum and covered with tungsten).

The following materials are mentioned which can be advantageously used in the arrangement according to the present invention:

For a temperature region of 350° – 504° K (Kelvin):
heat transporting medium = water ($H_2O$);
the material for the capillary structure = Cr-Ni-steel;
the material for the tube = Cr-Ni-steel or special brass.

For a temperature region of 600°–1000° K:
heat transport medium = Cesium (Cs);
the material for the capillary structure = titanium (Ti);
the material for the tube = titanium (Ti) or Cr-Ni-steel.

For a temperature region of 650° – 1100° K:
the heat transport medium = potassium (K);
the material for the capillary structure = Cr-Ni-steel;
the material of the tube = Cr-Ni-steel.

For a temperature region of 750° – 1200° K:
the heat transport medium = sodium (Na);
the material of the capillary structure = Cr-Ni-steel;
the material of the tube = Cr-Ni-steel.

Further constructive characteristics of the heat pipe according to the present invention will be discussed later on.

According to a further modification of the invention, the heat transmitting system consists of a tubular heat transporting body with separate feed channels for the transport of the heat transport medium in two directions, in which the heat transport medium in the system is circulated by change of its density in dependence on the temperature. In such a closed heat transport body metals, as well as the salts thereof and metal alloys which have a low melting point are used as a heat transport medium.

In this modification of the invention, the characteristic of such heat transport medium is used, that its density is changed dependent on the temperature imparted to the heat transmitting system.

The heat stream in such a system is defined by the product of the heat of fusion and the mass stream of heat transport medium. The temperature gradient prevailing between the heat receiving zone and the heat releasing zone maintains the heat transport medium in the feed channels in motion and produces during the circulation a convective heat transmission within the closed heat transmitting body. The temperature gradient causes thereby a density gradient, which, also in connection with the field of gravitation, produces the pressure gradient for the circulation. Decisive for the heat transmission of the heat transmission body according to the present invention is especially the magnitude of the heat of fusion of the heat transport medium. The selection of the heat transport medium will depend on the operating temperature of the torch to be used, respectively on the maximum temperature which will continuously prevail in a critical region of the torch head.

The following metals, metal salts and metal alloys are mentioned as heat transport media in dependence on the operating temperature:

(a) potassium (K): melting point = 63° C, heat of fusion = 14 Kcal/kg;

(b) woods-alloys (50% bismuth, 25% lead, 12.5% tin, 12.5% cadmium),
melting point = 76° C, heat of fusion = 7.8 Kcal/kg;

(c) sodium (Na): melting points = 97.7° C, heat of fusion = 27.0 Kcal/kg;

(d) sodium phosphate: melting points = 36.0° C, heat of fusion = 67.0 Kcal/kg; and (e) sodium nitrate: melting point = 306° C, heat of fusion = 65.0 Kcal/kg.

Since the heat transmission in the mentioned system increases with the magnitude of the heat of fusion of the used heat transport medium, potassium and sodium salts are preferred, preferably the sodium salts mentioned in paragraphs (d) and (e) for higher loading of the system.

Since the heat of fusion, as well as the specific heat of the mentioned metal salts are a multiple, as shown in the above-mentioned examples, of those of the metals thereof, it is possible by the use of the metal salts to transmit with the same amount of salt more heat and the amount of salt to be used may, as compared with the metals, be essentially reduced.

If the invention is used in an electrically operated welding torch with a welding wire guide and current conductive nozzle and protective gas operation, then it is especially constructively and functionally advantageous if, according to a further feature of the invention, the heat receiving zone of the heat pipe or of the heat transporting body is connected in a heat conductive manner with the welding wire guiding and current conductive nozzle by means of an intermediate member of high heat conductive material, that a welding wire guide tube extends through the inner tube of the heat pipe or the heat transporting body to the welding wire guiding and current conductive nozzle, and that the protective gas is guided about the heat releasing zone of the heat pipe or heat transporting body through the torch body to the metallic gas outlet nozzle. This will result, on the one hand, in an extremely compact arrangement of the primary cooling system according to the present invention and, on the other hand, in a perfect heat conductive connection between the welding wire guiding and current conductive nozzle, which is thermally loaded to the highest degree, and the heat receiving zone of the primary system, and at the same time in an extremely effective and simple convective heat transmission from the heat releasing zone of the primary system to the protective gas, which therefore, by itself, serves as secondary system. Any additional cooling steps become unnecessary.

In order to increase the cooling action further and to obtain at the same time an increased use of the protecting gas for the heat transmission, it is advantageous according to a further modification of the invention if the inner tube of the heat pipe, or the heat transporting body, is extended in the direction toward the torch housing, while enclosing with a radial clearance the welding wire guide tube, to thus form a flow channel and that this flow channel is connected to a source of protective gas at one end and at the other end through connecting channels in the intermediate member with the interior of the outlet nozzle, and that separated therefrom the protective gas, which circulates about the heat releasing zone of the heat pipe or the heat transporting body, is guided through outer flow channels and openings in the outlet nozzle onto the outer jacket of the latter. This will assure not only a considerably increased convective heat transmission from the primary system to the secondary system of the protective gas, but at the same time this will result in a constructive simple and advantageous arrangement in which by the inner and the outer protective gas stream the desired action of the latter is considerably increased.

If the above-described heat pipe is used as primary system, it is advantageous if, according to a further feature of the invention, the capillary structure of the heat pipe is formed by screw threads in both inner surfaces of the pipe and by wire nets applied to the screw threads, as well as onto opposite surfaces of radially extending supporting walls in the pipe. This capillary structure has provel especially advantageous for the desired optimum heat convection. The supporting walls with the wire netting applied thereto serve to increase the area of the capillary structure. In most cases it is advantageous if the walls of the heat pipe, the supporting walls and the wire netting are formed by Cr-Ni-steel, while water is used as heat transporting medium of the heat pipe.

An especially compact and for the manual operation, respectively machine operation, especially simple and advantageous construction is derived if, in accordance with a further feature of the present invention, the heat pipe or heat transporting body, the welding wire guide and current conductive nozzle, the welding wire guide tube, the intermediate member, the metal outlet nozzle and the torch body are concentrically arranged and connected to a unit, in which the metal outlet nozzle and the intermediate member, as well as the metal outlet nozzle and the torch body are respectively connected with each other by tubular elements of heat insulating material.

If a heat transporting body with feed channels is used, then it is, according to a further feature of the present invention, advantageous if the feed channels are helically formed and communicate at opposite ends thereof in the heat receiving zone and in the releasing zone with each other. In this way an especially advantageous heat transmission is obtained. It is also advantageous if the heat channel for the flow of the heat transmitting medium from the heat receiving zone to the heat releasing zone, and the feed channel for the flow of the heat transmitting medium in the opposite direction, have respectively different open cross-sections.

If a heat transport body is used, an especially advantageous construction is derived, if the heat transport body is formed by an inner tube consisting of a continuation of the intermediate member and formed in its outer wall with a channel for transporting the heat transporting medium from the heat releasing zone back to the heat receiving zone, by an intermediate tube enclosing the inner tube and formed in its outer wall with a channel for transporting the heat transmitting medium from the heat receiving zone to the heat releasing zone, and by an outer tube enclosing the intermediate tube, whereby at the ends of the inner and intermediate tube distributing spaces are provided through which the two channels communicate with each other. This modification of the heat transporting body which is constructed of concentric tubes simplifies the production thereof and its assembly with the remainder of the torch.

The various embodiments according to the present invention are combined hand- or machine-operated welding torches for use during sigma, respective MIG-MAC welding operations, in which electrical currents up to 600 amperes are used and in which the torches are operated with protective gases, such as $CO_2$, argon-$CO_2$ mixtures and argon.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a longitudinal cross-section of part of the embodiment shown in FIG. 1, at an enlarged scale;

FIGS. 2a, 2b and 2c are respectively transverse cross-sections through the torch according to FIG. 2 taken along the lines A—A, respectively B—B, respectively C—C; and FIG. 3 is a longitudinal cross-section, similar to that shown in FIG. 2, but through a second embodiment according to the invention.

DESCRIPTION OF THE PREFERRED EMBODIMENTS

Figure 1:
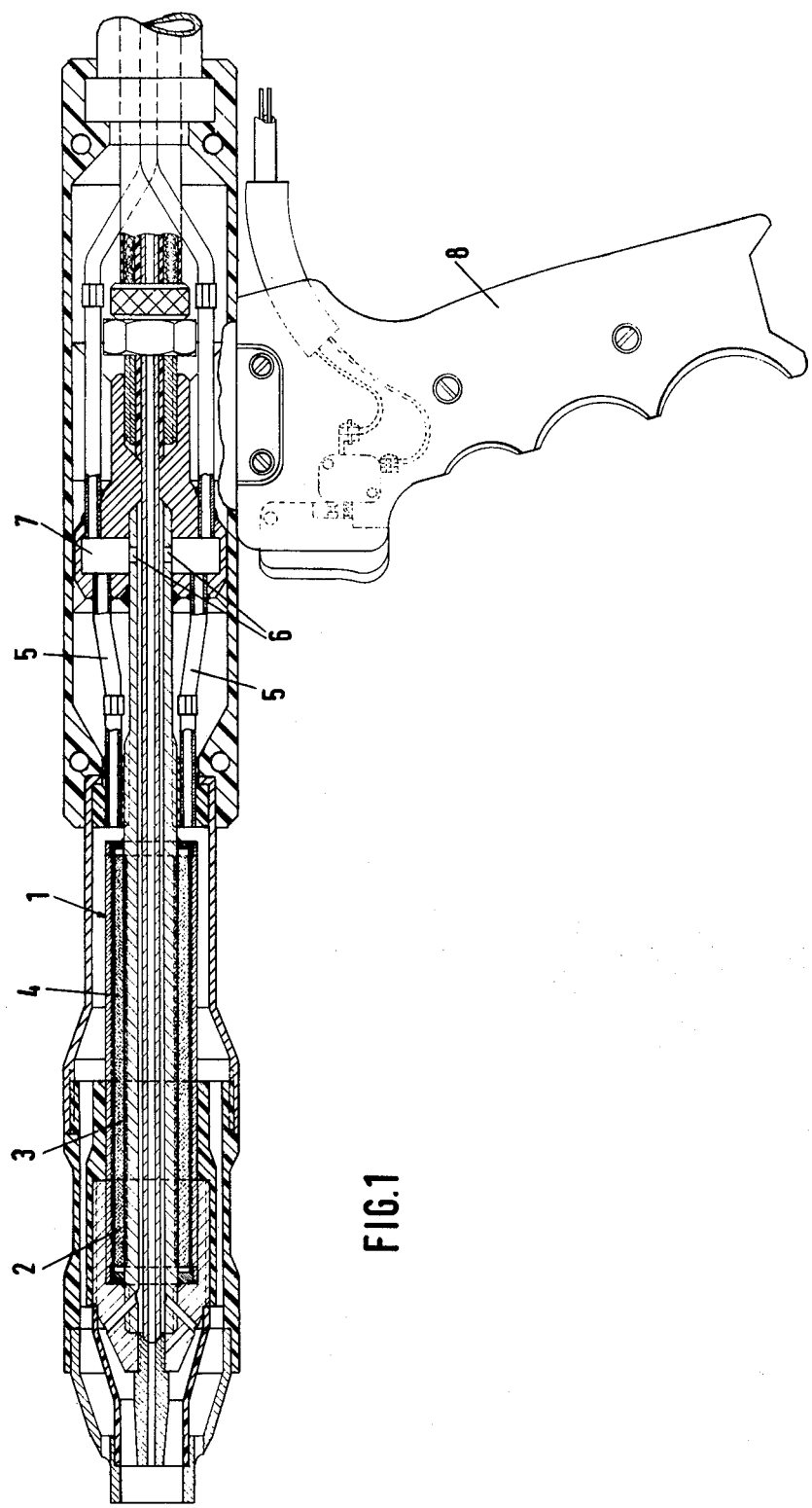
FIG. 1 is a longitudinal cross-section through a combined hand- or machine-operated welding torch according to the present invention.

The Sigma-, manual- or machine-operated welding torch illustrated in FIG. 1 is provided, according to the present invention, in its front part between the torch head, shown at the left end of the torch in FIG. 1, and the torch housing, shown at the right end thereof, with a heat pipe 1. The heat pipe 1 may be divided according to FIG. 1 into a heat receiving zone 2, a heat transporting zone 3, and a condensation or heat releasing zone 4. The welding torch shown in FIG. 1 is further provided with two separated protective gas stream passages 5 and 6, into which protective gas is guided from a distributing chamber 7, and with a releasably connected handle 8.

The heat pipe 1, shown at an enlarged scale in FIG. 2, is a "heat-conductor" with high heat conductive capacity, which has the task to receive the operating heat of the welding torch over the welding wire guide and current conductive nozzle 9 and over the intermediate member 10 in its heating or heat receiving zone 2 (FIG. 1).

The wire guide and current conductive nozzle 9, as well as the intermediate member 10, are preferably formed from copper which has a good current and heat conductive capacity, whereby the intermediate member 10 has a large volume, in order to quickly and effectively transmit the working temperature of the nozzle 9 to the heat receiving zone of the heat pipe 1. A braking action on the welding wire to be transported by too highly heated guide nozzles is in this way prevented. Preferably the intermediate member 10 and the heat pipe 1 are connected in the heat receiving zone of the latter by welding or soldering.

The heat pipe 1, shown in FIGS. 1 and 2, is of special construction into which the actual torch tube 11 is tightly integrated. The illustrated heat pipe 1 is formed together with the end plates 12 and 13 at opposite ends of the heat pipe 1, from Cr-Ni-steel, preferably from X12 Cr-Ni-18-8 steel, which contains 18% of Cr and 8% of Ni and is all around hermetically closed by a soldering or welding operation. The two end plates 12 and 13 are also firmly and absolutely leak-proof connected by hard solder with the torch tube 11, which is formed of special brass. The heat pipe 1 has for instance a total length of 100 mm, an outer diameter of 21 mm, and an outer wall thickness of 1.5 mm. The end plate 13 at the heat receiving zone has a wall thickness of for instance 3.5 mm, the end plate 12 in the condensation or heat releasing zone has a wall thickness of for instance 3 mm, and the torch tube 11 has an outer diameter of for instance 12 mm. The screw threads 14 at the inner surface of the heat pipe 1 have a pitch of 0.3 mm, and a depth of 0.2 mm. On the outer surface of the tube 11, which forms the inner wall of the heat pipe 1 screw threads 15 are likewise provided which likewise have a pitch of 0.3 mm, and a depth of 0.2 mm. Both screw threads are formed as sharp V-threads.

The heating or heat receiving zone 2 of the heat pipe 1 has a length of for instance 20 mm, the heat transporting zone a length of for instance 22 mm, and the condensation and heat releasing zone 4 a length of for instance 51.5 mm.

A plurality of annularly spaced, for instance eight, supporting metal sheets or walls 16 are provided between the threads 15 of the tube 11 and the threads 14 on the outer tube, which are formed of Cr-Ni-steel, preferably X12 Cr-Ni-18-8 steel, and which preferably have a wall thickness of for instance 1 mm.

The support sheets 16 are held at opposite ends thereof in for instance 1 mm deep grooves in the end plates 12 and 13. The opposite surfaces of the support sheets 16 are covered with wire netting 17 connected thereto by microplasma spot-welding. The wire nettings 17 preferably comprise a 100 mesh netting and are likewise formed of Cr-Ni-steel, preferably X12-Cr-Ni-18-8. The opposite edges of the wire netting 17 respectively abut tightly against the screw threads 14 and 15.

The heat transport medium for the heat pipes shown in FIGS. 1 and 2 is preferably water. In order to obtain good wetting characteristics, the heat pipes with the support metal sheets and the wire netting attached thereto are annealed in vacuum for cleaning the same. This will prevent also that undesired gas rests will be freed during operation. Subsequently thereto water is introduced into the tube under a protective gas atmosphere (argon), until the screw threads and the interstices between the wire netting in the interior of the heat pipe are saturated. The filled heat pipe is immediately thereafter placed in a vacuum hard soldering oven. As soon as the desired pressure, of for instance $10^{-4}$ Torr, is reached, the two end plates 12 and 13 are connected with a vacuum hard solder containing silver to the outer tube 1a and the tube 11.

The operating heat of the illustrated Sigma-welding torch is transmitted from the wire guide and current conductive nozzle 9, over the intermediate member 10, onto the circumference of the heating zone 2 of the heat pipe 1. The heat transport medium, i.e. water, which is contained in the capillary structure 14, 15 and 17 of the heat pipe will evaporate and absorb the heat of evaporation. The vapor flows in the direction of the temperature gradient and condenses in the condesation zone 4 of the heat pipe, thereby transmitting the heat of evaporation onto the outer wall thereof. The condensate is transported back into the heating, respective evaporation zone by the capillary structure 14, 15 and 17. The special heat pipe 1, according to the invention, illustrated in FIGS. 1 and 2, is a screw thread artery heat pipe with eight special net artery webs. This heat pipe differs from other heat pipes in principle in that for the back transport of the condensate to the heating zone and for its distribution over the circumference of the heating zone different capillary structures are used. The liquid is transported in axial direction of the heating zone by the eight net arteries webs. For the azimuthal transport of the liquid serve the screw thread arteries. In the condensation zone the condensate is sucked by the net arteries covering the webs 16 out of the screw thread arteries 14 and 15. The miniscus which withdraws into the bottom of the screw thread arteries 14 and 15 produces in the heating zone the necessary capillary pressure difference which is necessary for the azimuthal liquid transport from the wire netting 17 covering the webs 16 to the heated wall. In this way the whole capillary pressure difference which corresponds to the maximum width of the screw threads, is maintained for the axial transport of the liquid.

The essential advantage of this arrangement is that the liquid heat transport medium need only be in part transported through the screw threads 14 and 15, for which screw threads of very small dimensions are sufficient, whereas for the axial liquid transport the net arteries formed by the wire netting 17 of large cross-section are available. The heat pipe according to the present invention is therefore perfectly suitable to obtain large heat surface loadings and in addition it has a very high axial transporting ability. The heat of evaporation released at the outer wall of the condensation zone 4 is transported during operation to the front end of the torch by the outer protective gas cooling stream, which is transmitted from a source of protective gas, not shown in the drawing, through the two protective gas channels 18. The heated-up protective gas stream passes, guided by the outer sleeve 19 of the torch, through the eight bores 21, extending circumferentially spaced from each other through the insulating sleeve 20. The insulating sleeve 20 consists of an electrical and heat insulating material. The protective gas stream, deflected by the torch head insulating sleeve 22, is guided along the outer wall of the metal gas nozzle 23 and passes from there through eight bores, distributed over the circumference of the metal gas nozzle 23, onto the welding border zone. The torch head insulating sleeve 22 consists also of electrical and heat insulating material. It serves at the same time as protector against welding material spatter and prevents thereby bridge formation between the wire guide and current conductive nozzle 9 and the metal gas nozzle 23. The guiding of the protective gas through the bores 24 of the nozzle 23 has the additional advantage that the welding border zone is very intensively protected by the protective gas from the influence of the outer atmosphere.

A second, inner protective gas stream is guided through the annular channel 25 in axial direction through the torch. The annular channel 25 results from the radial distance between the inner surface of the torch tube 11 and the tube 26 for guiding the welding wire. The second, inner protective gas stream reaches, over four bores 27 formed in the intermediate member 10, the inner portion of the torch head. This inner protective gas stream serves to protect the material emanating from the end of the wire guide nozzle 9 from the detrimental influence of the outer atmosphere.

A bushing 28 of electrical and heat insulating material serves to receive the front parts of the torch and of the torch tube 11. The two protective gas conduits 18 are molded into the bushing 28. The bushing 28 is encompassed between the two part shell 29 of the torch housing.

FIG. 3 illustrates a second embodiment according to the present invention. The Sigma hand- or machine-welding torch illustrated in FIG. 3 is provided with a closed heat transporting system which differs in construction and function from the system described above. The heat transporting system shown in FIG. 3 comprises a tubular heat transport body with separate channels for transporting the heat transport medium in opposite directions, in which the heat transport medium of the system is circulated by the change of its density in dependence on the temperature thereof.

Elements of the torch shown in FIG. 3, which essentially correspond to the elements of the torch described in connection with FIGS. 1 and 2, are designated in FIG. 3 with the same reference numerals. Metals, metal alloys and the salts thereof, which are hermetically enclosed in the heat transport body and which have a low melting point, are used as heat transport media in the heat transport body of the embodiment shown in FIG. 3. The preferred heat transport media have been already described above. The construction and operation of the torch shown in FIG. 3 will now be described.

The operating heat of the torch head of FIG. 3, which preferably is formed of copper, is transmitted from the wire guide and current conductive nozzle 9 onto the intermediate tubular member 10a which preferably consists of copper, Cr-Ni-steel or special brass. The tubular intermediate member 10a is provided at its outer surface with a helically extending channel or groove 30 for the heat transport medium. The member 10a forms the inner tube of the heat transport body of the embodiment shown in FIG. 3. The heat transport medium melts in the heat receiving-, respectively melting zone 31 takes up the heat of fusion and flows through four 90° displaced bores 32 into a helically extending channel 33 provided on the outer circumference of an intermediate tubular member 34. The heat transport medium flows in the direction of the temperature gradient and releases continuously its heat of fusion over the outer tube 35, which acts as heat release zone and which closes the channel 33 at the outer periphery thereof. The outer tube 35 is additionally provided with eighteen circumferentially spaced, axially extending cooling grooves 36. The cooled heat transport medium flows from the outer channel 33 over four, through 90° displaced, back guiding bores 37 and the reversing channel 38 into the helical channel 30 provided in the member 10a. Due to the heat stream, resulting from the temperature gradient, the heat transport medium passes through the channel 13 again into the heat receiving- or melting-zone 31, to start thereby a renewed heat medium circulation.

In order to assure a better back transport of the cooled heat transport medium, the back transport channel 30 has a larger open cross-section than the open cross-section of the outer channel 33.

The heat transport medium 39 to be used in the embodiment shown in FIG. 3 is preferably metallic sodium or sodium phosphate.

The heat of fusion, released from the outer surface of the outer tube 35 and the cooling grooves 36 provided therein, is transported by the outer protective gas stream which is transmitted through the two protective gas channels 18 in axial direction onto the electrical and heat-insulating outer zone of the torch head. The thus-heated-up protective gas stream is guided through the outer torch sleeve 19 and pressed through the eight circumferentially distributed bores 21 of the insulating sleeve 20. The sleeve 20 consists of electrical and heat insulating material. The protective gas stream is subsequently deflected by the torch head insulating sleeve 22, guided along the inner surface of the metal gas nozzle 23, and escapes through eight bores 24, which are uniformly distributed about the circumference of the nozzle 23, onto the welding border zone. The torch head insulating sleeve 22 consists likewise of electrical and heat insulating material. It serves at the same time as protector against welding material spatters and thus prevents bridge formation between the wire guide and current conductive nozzle 9 and the gas nozzle 23 of metal. The outer protective gas stream guided over the bores 24 of the gas nozzle 23 has the additional advantage that the welding border zone is better protected by the protective gas against detrimental influence of the outer atmosphere.

According to the present invention an additional protective gas stream for dissipation of the heat is provided. For this purpose a second, inner protective gas stream is guided forwardly through the annular channel 25. The annular channel 25 results from the radial distance between the bore in the torch tube 11, respectively the bore through the intermediate member 10a, and the outer surface of the welding wire guide tube 26. The second, inner gas stream reaches over four bores 27 the interior of the torch head. The inner protective gas stream serves to protect the material emanating from the nozzle 9 against detrimental influence of the outer atmosphere.

A bushing 28 of electrical and heat insulating material serves to receive the front parts of the torch body and the tube 11. The two protective gas tubes 18 are molded into the bushing 28. The bushing 28 is embedded in the two part shell 29 of the torch housing.

The elongated intermediate member 10a which serves as the inner tube of the heat transport body, the intermediate tube 34 surrounding the inner tube and the outer tube 35 surrounding the intermediate tube preferably consists of Cr-Ni-steel, for instance X12 Cr-Ni 18-8 steel.

Before assembly of the heat transport body shown in FIG. 3, the various elements thereof are preferably annealed in vacuum and subsequently connected to each other into a unit by hard soldering. The heat transport medium is filled into the channels of the heat transport body, preferably under a protective gas atmosphere (argon), through bores 40, which are subsequently closed by hard soldering in vacuum. The parts 10a and 34 are pushed with a press-fit into each other and finally the outer tube 35 is likewise mounted with a press-fit onto the tube 34. During filling of the heat transport medium into the channels a small free space is maintained therein to provide for the increased volume of the heated heat transport medium. This free space is to be determined in accordance with the expected maximum temperature and the coefficient of expansion of the heat transport medium. By the annealing in vacuum any impurities on the various elements of the heat transport body are positively eliminated.

It will be understood that each of the elements described above, or two or more together, may also find a useful application in other types of welding-, cutting-, or heating torches differing from the types described above.

While the invention has been illustrated and described as embodied in a welding-, cutting-, or heating torch provided with a hermetically sealed heat transmitting means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A welding-, cutting-, or heating-torch in which a gas is used for operation of the torch, comprising a torch head having an outlet nozzle with an outlet end; a torch housing rearwardly spaced from said torch head; connecting means in form of outer sleeve means connecting said torch head with said torch housing and forming gas passage means having a front end communicating with said outlet nozzle and a rear end in said torch housing; means for feeding gas as necessary for the operation of the torch into said rear end of said gas passage means so that such gas passes through said gas passage means and leaves the latter through said front end thereof; and elongated hermetically closed heat transmitting means confined in its entirety within said torch for automatically transporting heat from a heat receiving zone which is adjacent said torch head is shielded from the gas passing through said gas passage means to a heat releasing zone which is rearwardly of said heat receiving zone is impinged by the gas passing through said gas passage means, whereby a region of the torch head which is heated to a high temperature during operation is cooled.

2. A torch as defined in claim 1, wherein said heat transmitting means comprises a liquid heat transporting medium which is evaporable at the heat receiving zone and which condenses at the cooled heat releasing zone, and capillary means for transporting the condensed medium from said heat releasing zone back to said heat receiving zone.

3. A torch as defined in claim 1, wherein said heat transmitting means comprises a tubular heat transporting body provided with separate channels for flow of a heat transporting fluid from said heat receiving zone to said heat releasing zone, and from the latter back to said heat receiving zone, said heat transporting fluid being circulated through said channels due to the change of its density in dependence on the different temperatures of said zones.

4. A torch as defined in claim 2, wherein said heat transmitting means comprises a heat pipe arranged concentric with a longitudinal axis of said torch and being connected in a heat conductive manner at said heat receiving zone to said outlet nozzle and wherein said heat releasing zone is located in a region which is flown through by said gas to be cooled by the gas.

5. A torch as defined in claim 3, wherein said tubular heat transporting body is arranged concentric with a longitudinal axis of said torch and connected in a heat conductive manner to said outlet nozzle and wherein said heat releasing zone is located in a region which is flown through by said gas to be cooled by the gas.

6. A torch as defined in claim 1, wherein said torch is an electrically operated welding torch and wherein said heat transmitting means is tubular, and including a welding wire guiding and current conductive nozzle arranged coaxially with said tubular heat transporting means, an intermediate member of highly heat conductive material connecting said heat receiving zone of said heat transmitting means with said wire guide and current conductive nozzle, wherein said gas is a protective gas, and wherein said gas passage means are arranged so that said protective gas flows about said heat releasing zone of said heat transmitting means.

7. A torch as defined in claim 6, wherein said connecting means includes a member of heat insulating material between said torch head and said connecting means and wherein said gas passage means includes a plurality of gas channels extending longitudinally through said member of insulating material and openings in said outlet nozzle.

8. A torch as defined in claim 7, wherein said outlet nozzle is of metal and including a tubular member of insulating material extending through said torch head and dividing the interior of the latter into an outer annular passage and an inner annular passage, both forming part of said passage means, said gas channels communicating with said outer annular passage.

9. A torch as defined in claim 8, and including a wire guide and current conductive tube coaxial with said wire guide and current conductive nozzle and extending radially spaced from said tubular heat transmitting means toward said torch housing to form with said tubular heat transmitting means an annular gas passage forming part of said gas passage means, and including connecting channels through said intermediate member providing communication between said annular gas passage and said inner annular space.

10. A torch as defined in claim 4, wherein said heat pipe comprises an outer tubular member and an inner tubular member coaxial with said outer tubular member, a pair of end plates fluid-tightly connecting said inner and outer tubular members at opposite ends thereof to each other, and a plurality of longitudinally extending walls projecting angularly spaced from each other from said inner tubular to said outer tubular member, said capillary means comprising screw threads respectively provided in the outer surface of the inner tubular member and in the inner surface of said outer tubular member and wire netting applied to opposite surfaces of said walls.

11. A torch as defined in claim 10, wherein said inner, said outer tubular member, said walls and said wire netting consist of Cr-Ni-steel.

12. A torch as defined in claim 1, wherein said heat transmitting means comprises a heat transport medium flowing from said heat receiving zone to said heat releasing zone and back from the latter to said heat receiving zone, said heat transport medium consisting of a material taken from the group consisting of water, cesium, potassium and sodium.

13. A torch as defined in claim 1, wherein said torch is an electrically operated welding torch, wherein said outlet nozzle is made from metal, wherein said heat transmitting means is tubular, and including a welding wire guide and current conducting nozzle, an intermediate member of highly heat conductive material connecting said heat receiving zone of said heat transmitting means with said wire guide and current conductive nozzle, a wire guide and current conductive tube extending from said wire guide and current conductive nozzle through said tubular heat transmitting means to said torch housing, said outlet nozzle, said heat transmitting means, and said wire guide and current conducting nozzle, said intermediate member and said wire guide and current conductive tube being coaxially arranged and forming a unit which includes tubular members of electrical and heat insulating material, one of which forms part of said connecting means connecting said torch head to said torch housing and the other connecting said outlet nozzle with said intermediate member.

14. A torch as defined in claim 3, wherein each of said separate channels extends helically about a longitudinal axis of said torch and including connecting spaces, connecting said separate channels at opposite ends thereof to each other.

15. A torch as defined in claim 14, wherein said separate channels have respectively different open cross-sections.

16. A torch as defined in claim 3, and including a wire guide and current conductive nozzle, an intermediate member of highly heat conductive material in heat conductive contact with said wire guide and current conductive nozzle, said heat transporting body comprising a tubular extension of said member forming an inner tube of said heat transporting body and being provided at its outer surface with a helical groove forming the channel for guiding the heat transporting medium from said heat releasing zone back to said heat receiving zone, an intermediate tube closely surrounding said inner tube and being provided at its outer surface with a helical groove forming the channel for guiding the heat transporting medium from said heat receiving zone to said heat releasing zone, connecting spaces respectively connecting said channels at opposite ends to each other, and an outer tube closely surrounding said intermediate tube.

17. A torch as defined in claim 3, wherein said heat transporting fluid comprises metals, metal alloys and metal salts of a low melting point and maintained in liquid condition during operation of the torch.

18. A torch as defined in claim 16, wherein said outer tube is provided at its outer periphery with longitudinally extending grooves to increase the heat radiation surface thereof.

19. A welding-, cutting-, or heating-torch in which a gas is used for the operation of the torch, comprising a torch head having an outlet nozzle with an outlet end; a torch housing rearwardly spaced from said torch head; a central metal tube extending longitudinally through said torch and having a nozzle-shaped front portion; a second metal tube extending coaxial to said central tube radially spaced therefrom and forming with the latter first gas passage means; a metallic torch head connecting body rearwardly of said nozzle-shaped front end of said central tube and having a front portion in heat conductive contact with said nozzle-shaped front end and said second tube, said first gas passage means having outlet means extending through said connecting body; and elongated hermetically closed heat transmitting means having a front heat receiving zone embedded in said connecting body and a heat releasing zone rearwardly of said connecting body for automatically transporting heat from said heat receiving zone to said heat releasing zone; outer sleeve means connecting said torch head and said torch housing and forming second gas passage means having a front portion communicating with said outlet nozzle and a rear portion surrounding said heat releasing zone of said heat transmitting means; and means in said torch housing for feeding a gas necessary for the operation of the torch into said first and second gas passage means so that the gas passing through said second gas passage means cools said heat releasing zone, said hermetically closed heat transmitting means together with said second gas passage means forming a primary cooling system and said first gas passage means forming a secondary cooling system, both supplied with gas necessary for operation of the torch and thus also used for cooling a region of the torch which is heated to a high temperature during operation.

* * * * *